United States Patent
Suh et al.

(10) Patent No.: US 10,728,853 B2
(45) Date of Patent: Jul. 28, 2020

(54) WAKE UP RADIO FRAME WITH SPECTRUM SPREADING BASED SINGLE CARRIER

(71) Applicants: Jung Hoon Suh, Ottawa (CA); Osama Aboul-Magd, Ottawa (CA); Kwok Shum Au, Ottawa (CA); Yan Xin, Ottawa (CA)

(72) Inventors: Jung Hoon Suh, Ottawa (CA); Osama Aboul-Magd, Ottawa (CA); Kwok Shum Au, Ottawa (CA); Yan Xin, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 15/695,454

(22) Filed: Sep. 5, 2017

(65) Prior Publication Data

US 2018/0103431 A1 Apr. 12, 2018

Related U.S. Application Data

(60) Provisional application No. 62/404,987, filed on Oct. 6, 2016, provisional application No. 62/426,843, filed on Nov. 28, 2016.

(51) Int. Cl.
| | | |
|---|---|---|
| *H04L 27/233* | (2006.01) | |
| *H04W 52/02* | (2009.01) | |
| *H04L 27/38* | (2006.01) | |
| *H04B 1/16* | (2006.01) | |
| *H04B 1/707* | (2011.01) | |

(52) U.S. Cl.
CPC .......... *H04W 52/0235* (2013.01); *H04B 1/16* (2013.01); *H04B 1/707* (2013.01); *H04L 27/233* (2013.01); *H04L 27/3845* (2013.01); *H04W 52/0216* (2013.01); *H04W 52/0229* (2013.01); *Y02D 70/00* (2018.01); *Y02D 70/10* (2018.01); *Y02D 70/14* (2018.01); *Y02D 70/142* (2018.01); *Y02D 70/26* (2018.01); *Y02D 70/40* (2018.01)

(58) Field of Classification Search
CPC ......... H04W 52/0235; H04W 52/0229; H04W 52/0216; H04L 27/233; H04B 1/707; H04B 1/16
USPC .................. 375/147, 149, 142; 370/320, 311
See application file for complete search history.

(56) References Cited

U.S. PATENT DOCUMENTS

| | | | | |
|---|---|---|---|---|
| 5,267,271 A | * | 11/1993 | Rice .................. | H04B 1/707 324/76.12 |
| 5,999,561 A | * | 12/1999 | Naden ................ | H04B 1/707 375/142 |
| 6,075,810 A | | 6/2000 | Raghavan et al. | |
| 2002/0110184 A1 | * | 8/2002 | Akopian ............. | H04B 1/7075 375/149 |

(Continued)

FOREIGN PATENT DOCUMENTS

| | | |
|---|---|---|
| CN | 101142755 A | 3/2008 |
| CN | 102812774 A | 12/2012 |
| WO | 2013081431 A1 | 6/2013 |

*Primary Examiner* — Fitwi Y Hailegiorgis

(57) ABSTRACT

Methods and systems for waking up a wireless receiving device having a wake-up radio (WUR) circuit. A low-power wake-up signal is transmitted, comprising a wake-up frame (WUF) including having a portion that is subjected to spectrum spreading and transmitted using a single carrier. The wake-up signal is processed by the receiving using non-coherent detection.

22 Claims, 12 Drawing Sheets

(56) References Cited

U.S. PATENT DOCUMENTS

| | | | |
|---|---|---|---|
| 2007/0008916 A1* | 1/2007 | Haugli | H04B 7/2041 370/320 |
| 2008/0198905 A1 | 8/2008 | Zhu et al. | |
| 2009/0109945 A1 | 4/2009 | Lakkis | |
| 2010/0214969 A1* | 8/2010 | Lamm | H04W 52/0216 370/311 |

* cited by examiner

WAKE UP RADIO FRAME WITH SPECTRUM SPREADING BASED SINGLE CARRIER

RELATED APPLICATIONS

This Application claims priority to and the benefit of U.S. Patent Application No. 62/404,987, entitled "WAKE UP RADIO FRAME WITH SPECTRUM SPREADING BASED SINGLE CARRIER," filed Oct. 6, 2016, and United States Patent Application No. 62/426,843, entitled "SPECTRUM SPREADING FOR OOK BASED SINGLE CARRIER WAKE UP RADIO FRAME," filed Nov. 28, 2016, the entireties of which are incorporated herein by reference.

FIELD

The present application relates to methods and systems for communicating with a wake-up receiver.

BACKGROUND

In wireless communication, efficient use of the available power is one of the main goals of system design. Often a wireless local area network (WLAN) device, for example a device used in Internet of Things (IoT) applications, relies on a limited power supply (e.g., as supplied by rechargeable or non-rechargeable batteries). Examples of such a device may include sensor devices located in remote fields or locations measuring some physical phenomenon, e.g., water level or temperature; and wearable devices measuring some bodily function, e.g., pulse rate.

Such a device may be designed to operate on a low duty cycle (e.g., communicating with an access point (AP) only once per day) and thus it may not be appropriate for its WLAN receiver circuit to be always on. The limited power supply (e.g., battery) of the device may be quickly exhausted if not provided with an appropriate sleep mode for the WLAN receiver circuit and an appropriate wake-up mechanism. The wake-up mechanism may require communication of a wake-up signal from the AP to the device.

SUMMARY

Wake-Up Radio (WUR) receivers are limited by power consumption. Thus, there is a need for a transmitted wake-up signal that can be detected by a WUR using a simple detection algorithm. Accordingly, example embodiments are directed to a system and methods that use a wake-up radio frame with a spectrum spreading based single carrier. According to one aspect is a method of providing a wake-up signal, including applying a spreading sequence to successive data bits in a wake-up frame to generate corresponding spread data sequences; modulating the spread data sequences onto a single carrier to generate a single-carrier wake-up signal that includes a spread spectrum signal portion; and transmitting the single-carrier wake-up signal over a wireless channel.

A simplified low power receiver design may be implemented by using a non-coherent detection process in which no channel estimation and no phase-offset compensation is performed by the WUR. Envelope detection can be used to improve accuracy in a non-coherent detection environment and compensate for radio frequency (RF) impairments, however envelope detection requires the use of a power consuming low-pass filters. Accordingly, example embodiments are described that use a wake-up radio frame and a WUR configuration that allows for non-coherent detection of a wake-up signal at a WUR without the use of envelope detection, thereby alleviating the requirement for an energy consuming low pass filter at the WUR.

In some configurations, the spreading sequence is a non-symmetrical sequence. In some embodiments, the successive data bits are mapped using Binary Phase-Shift Keying (BPSK), and applying a spreading sequence comprises multiplying each of the data bits by each element of the spreading sequence. In other embodiments the successive data bits are mapped using on-off Keying (OOK), and applying a spreading sequence comprises applying an exclusive-OR function to each of the data bits with each element of the spreading sequence.

In some examples a reference signal is modulated onto the single carrier prior to the spread data sequences as part of the wake-up signal, and the reference signal comprises repeated sequences, such as Golay sequences, enabling auto-correlation.

In some aspects, the present disclosure describes a method of processing a single-carrier signal containing a representation of data bits. The method includes receiving, at a receiver circuit, a single-carrier signal including a spread spectrum signal portion carrying spread data sequences that correspond to data bits of a data frame. The method also includes separating, at the receiver circuit, each spread data sequence into an in-phase sequence and a quadrature-phase sequence. The method also includes determining, at the receiver circuit, for each in-phase sequence, an in-phase component. The method also includes determining, at the receiver circuit, for each quadrature-phase sequence, a quadrature-phase component. The method also includes assigning, at the receiver circuit, a data bit value for each spread data sequence, based on a combined magnitude of the respective in-phase and quadrature-phase components.

In any of the preceding aspects/embodiments, determining the in-phase sequence component may include multiplying the in-phase sequence with a reference vector, and determining the quadrature-phase component may include multiplying the quadrature-phase sequence with the reference vector, the reference vector being identical to a spreading sequence used for generation of the spread spectrum signal portion.

In any of the preceding aspects/embodiments, determining the in-phase component may include multiplying the in-phase sequence with a reference vector, and determining the quadrature-phase component may include multiplying the quadrature-phase sequence with the reference vector, the reference vector being either all ones or all negative ones.

In any of the preceding aspects/embodiments, the spread spectrum signal portion may contain a representation of on-off keying (OOK)-mapped data bits.

In any of the preceding aspects/embodiments, the spread spectrum signal portion may contain a representation of binary phase-shift keying (BPSK)-mapped data bits.

In any of the preceding aspects/embodiments, processing the single-carrier signal may be performed using non-coherent detection.

In any of the preceding aspects/embodiments, the method may further include transmitting, at the receiver circuit, an internal wake-up signal, based on the assigned data bit values.

In some aspects, the present disclosure describes a receiver circuit. The receiver circuit is configured to receive a single-carrier signal including a spread spectrum signal portion carrying spread data sequences that correspond to data bits of a data frame. The receiver circuit is also configured to separate each spread data sequence into an in-phase sequence and a quadrature-phase sequence. The receiver circuit is also configured to determine, for each in-phase sequence, an in-phase component. The receiver circuit is also configured to determine, for each quadrature-phase sequence, a quadrature-phase component. The receiver circuit is also configured to assign a data bit value for each spread data sequence, based on a combined magnitude of the respective in-phase and quadrature-phase components.

In any of the preceding aspects/embodiments, the receiver circuit may be configured to determine the in-phase component by multiplying the in-phase sequence with a reference vector, and may be configured to determine the quadrature-phase component by multiplying the quadrature-phase sequence with the reference vector, the reference vector being identical to a spreading sequence used for generation of the spread spectrum signal portion.

In any of the preceding aspects/embodiments, the receiver circuit may be configured to determine the in-phase component by multiplying the in-phase sequence with a reference vector, and may be configured to determine the quadrature-phase component by multiplying the quadrature-phase sequence with the reference vector, the reference vector being either all ones or all negative ones.

In any of the preceding aspects/embodiments, the spread spectrum signal portion may contain a representation of on-off keying (OOK)-mapped data bits.

In any of the preceding aspects/embodiments, the spread spectrum signal portion may contain a representation of binary phase-shift keying (BPSK)-mapped data bits.

In any of the preceding aspects/embodiments, the receiver circuit may be configured to process the single-carrier signal using non-coherent detection.

In any of the preceding aspects/embodiments, the receiver circuit may be a wake-up receiver circuit that may be configured to transmit an internal wake-up signal to another receiver circuit, based on the assigned data bit values.

In some aspects, the present disclosure describes a method of providing a wake-up signal. The method includes applying a spreading sequence to successive data bits in a wake-up frame to generate corresponding spread data sequences. The method also includes modulating the spread data sequences onto a single carrier to generate a single-carrier wake-up signal that includes a spread spectrum signal portion containing the spread data sequences. The method also includes transmitting the single-carrier wake-up signal over a wireless channel.

In any of the preceding aspects/embodiments, the spreading sequence may be a non-symmetrical sequence.

In any of the preceding aspects/embodiments, the method may also include mapping the successive data bits using Binary Phase-Shift Keying (BPSK). Applying a spreading sequence may include multiplying each of the data bits by each element of the spreading sequence.

In any of the preceding aspects/embodiments, the method may also include mapping the successive data bits using on-off Keying (OOK). Applying a spreading sequence may include applying an exclusive-OR function to each of the data bits with each element of the spreading sequence.

In some aspects, the present disclosure describes an access point for a wireless local area network. The access point includes a transceiver circuit to provide a wake-up signal. The transceiver circuit is configured to apply a spreading sequence to successive data bits in a wake-up packet to generate corresponding spread data sequences. The transceiver circuit is also configured to modulate the spread data sequences onto a single carrier to generate a single-carrier wake-up signal that includes a spread spectrum signal portion containing the spread data sequences. The transceiver circuit is also configured to transmit the single-carrier wake-up signal over a wireless channel.

In any of the preceding aspects/embodiments, the spreading sequence may be a non-symmetrical sequence.

In any of the preceding aspects/embodiments, the successive data bits may be mapped using Binary Phase-Shift Keying (BPSK), and the spreading sequence may be applied by multiplying each of the data bits by each element of the spreading sequence.

In any of the preceding aspects/embodiments, the successive data bits may be mapped using on-off Keying (OOK), and the spreading sequence may be applied by applying an exclusive-OR function to each of the data bits with each element of the spreading sequence.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

A user device or station such as a machine type device or sensor device that is intended to operate in a wireless network such as a wireless local area network (WLAN) may have a separate low-power wake-up radio (WUR) receiver circuit in addition to a higher power WLAN transceiver circuit. A WUR circuit is generally a low-power receiver circuit designed for receiving and detecting a wake-up signal, and may in some examples be a simplified version of the main WLAN transceiver circuit and may be implemented on integrated circuit (IC) or chip. The WUR circuit communicates with the WLAN transceiver circuit, or other equivalent circuit, of the device, so the WLAN transceiver circuit may sleep and conserve power until the WUR circuit wakes up the WLAN transceiver circuit. The WUR circuit wakes up the WLAN transceiver circuit, or other equivalent circuit, when the WUR circuit detects a wake-up signal from an access point (AP) (typically, an AP associated with the WLAN device).

Figure 1:
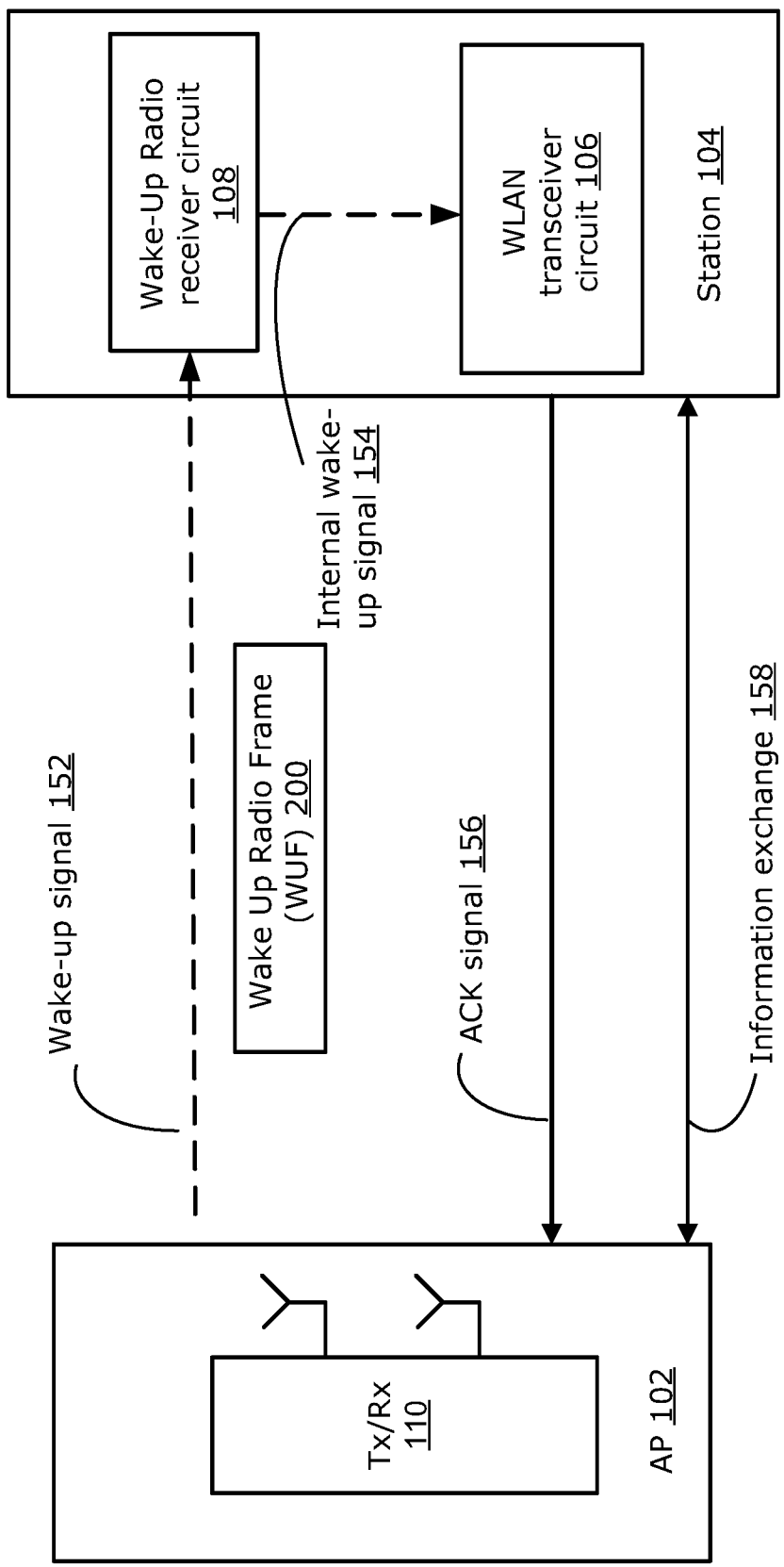
FIG. 1 is a block diagram illustrating communications between an AP and an example station having a wake-up receiver circuit.

In this regard, FIG. 1 is a schematic diagram illustrating an example AP 102 and an example station 104 (e.g., a low duty cycle WLAN device or other wireless device) associated with the AP 102. The example station 104 includes a WLAN transceiver circuit 106 (e.g., a Wi-Fi transceiver) and a WUR circuit 108 (also referred to simply as WUR 108). The AP 102 includes WLAN transceiver circuit 110. In example embodiments, the WUR 108 is a simple low power receiver that does not have a transmitter and functions to wake up the WLAN transceiver circuit 106 when needed.

FIG. 1 illustrates a set of example signals that may be communicated for waking up a sleeping WLAN receiver circuit 106 of a station 104 (also referred to as an electronic device). The AP 102 may send a wake-up signal 152, carrying a Wake-Up-Frame (WUF) 200 (described further below) to the station 104. In some examples, WUF 200 is a low data rate signal. The WUF 200 is detected by the WUR circuit 108, and the WUR circuit 108 sends an internal wake-up signal 154 to the WLAN receiver circuit 106, waking up the WLAN transceiver circuit 106 if the WLAN receiver circuit 106 is in sleep mode. The WLAN transceiver circuit 106 then sends an ACK signal 156 back to the AP 102. Appropriate information exchange 158 between the AP 102 and the station 104 (via the WLAN transceiver circuit 106) may then take place. After the information exchange 158 is finished, the WLAN transceiver circuit 106 may return to the sleep state.

Although FIG. 1 shows wake-up signal 152 being communicated to a WUR circuit 108 that is associated with a WLAN transceiver circuit 106, the processes and systems described in the present disclosure may be applicable to other circuits, including other wireless receiver circuits, which may benefit from a wake-up mechanism.

In an example embodiment, the wake-up signal 152 is communicated using a single carrier (SC). The wake-up signal 152 may for example contain a spread spectrum signal portion carrying part of WUF 200, to facilitate easy detection by low power consuming WUR 108.

Figure 2:
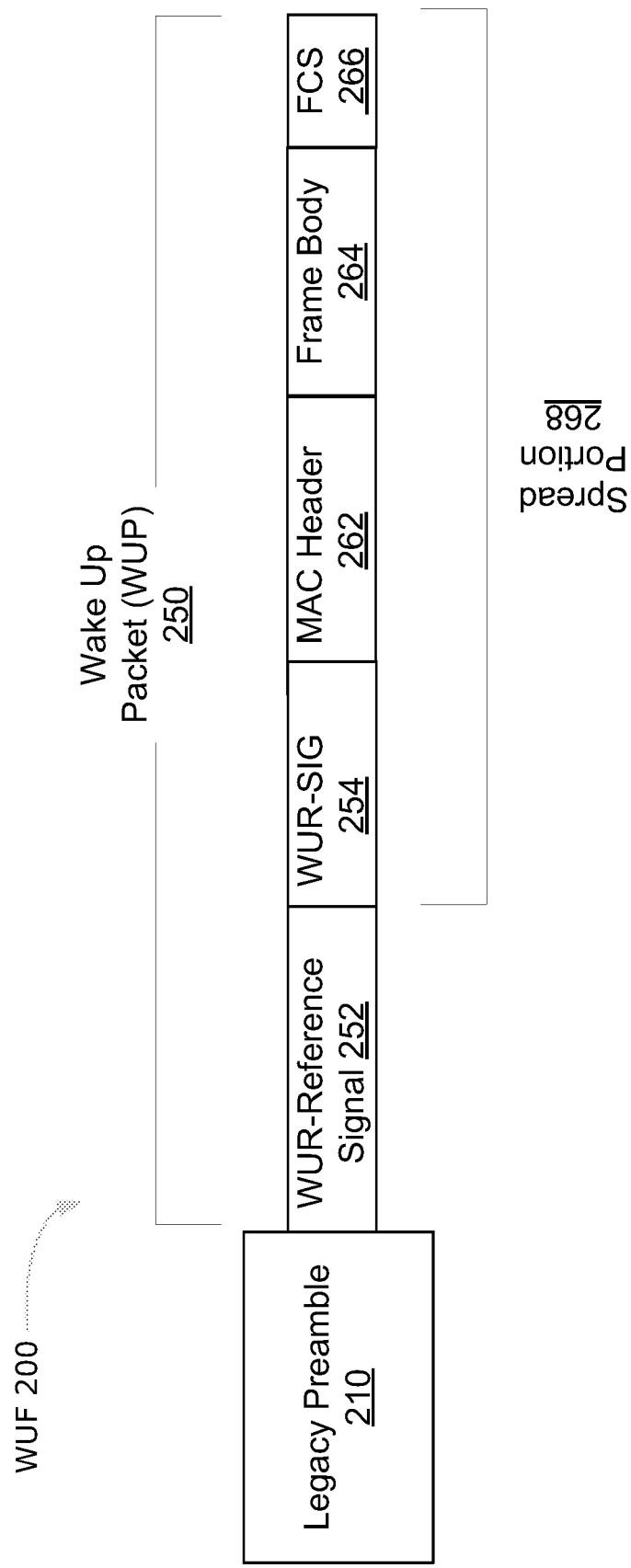
FIG. 2 illustrates a frame format for an example wake-up frame.

An example frame format for an example WUF 200 is shown in FIG. 2. The heights of the various blocks shown in FIG. 2 illustrate the relative bandwidths (BWs) of each portion. In the example of FIG. 2, the WUF 200 includes a legacy preamble 210 pre-pended to a wake-up portion or packet (WUP) 250. The WUP 250 includes a WUR-Reference Signal field 252, a WUR-signal (SIG) field 254, a MAC header 262, a frame body 264 and a frame check sequence (FCS) 266. The MAC header 262, frame body 264 and FCS 266 may together be referred to as the payload of the WUR portion 250.

The legacy preamble 210 serves to silence all non-destination WLAN devices during the transmission of the WUF 200. The legacy preamble 210 may include a legacy short training field (L-STF), a legacy long training field (L-LTF), and a legacy signal (L-SIG) field. The legacy preamble 210 is generally 20 MHz wide in BW, in accordance with legacy standards. In the example of FIG. 2, the WUP 250 is illustrated as being narrower in BW than the legacy preamble 210, for example the WUP 250 may be 4 MHz in BW, although other BWs may also be suitable. The legacy preamble 210 is used for coexistence with other IEEE 802.11 devices, however in some examples the legacy preamble 210 may be omitted.

The WUR-Reference Signal 252 is provided for packet detection and synchronization purposes. Example embodiments of suitable attributes for WUR-Reference Signal 252 are discussed in greater detail below.

Figure 3:
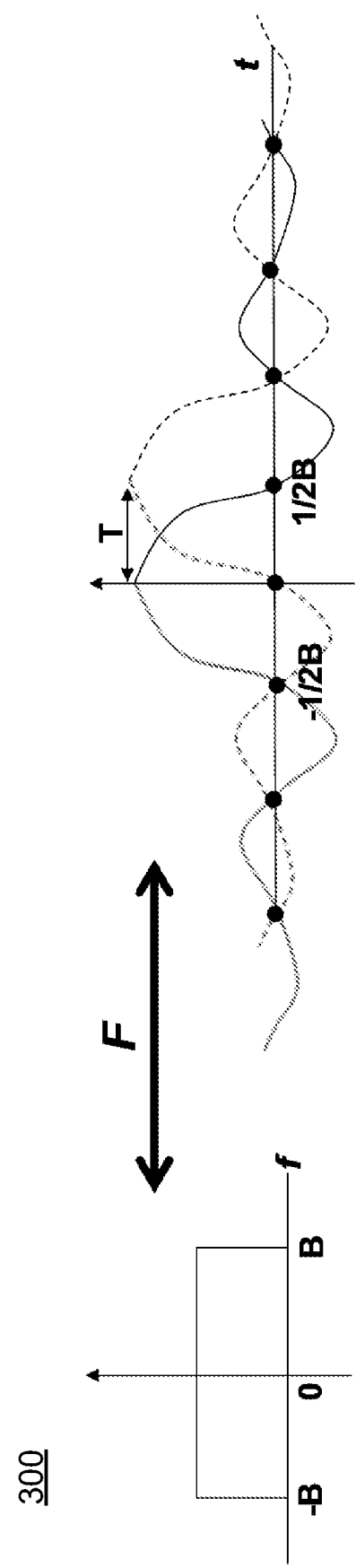
FIG. 3 illustrates a single carrier channel in frequency and time domain.

In example embodiments, the fields in the WUP 250 that follow the WUR-Reference Signal 252 are configured to facilitate detection and decoding by low power WUR circuit 108. FIG. 3, which illustrates a single-carrier channel 300 in frequency and time domain, provides context for example embodiments that are described below. In FIG. 3, channel bandwidth (BW) is equal to B. For a single carrier, the pulse or symbol period T must be at least $1/(2 \times B)$ in order to avoid inter symbol interference (ISI), providing a maximum pulse or symbol rate $SR=1/T$. By way of example, if $B=4$ MHz, then $T_{min}=0.125$ µsec and $SR_{max}=8$ MHz.

In some applications, detection can be difficult at the maximum channel rate. When Power Spectrum Density (PSD) is limited, a spread spectrum scheme may provide an extra performance gain, which is called a spreading gain or process gain and is measured in 10 log(Spreading Factor SF) dB. For example, if an 8-bit spreading sequence is applied to each corresponding bit in a data stream, then the spreading factor SF will be 8. Spreading gain is observed in addition to any applicable diversity gain.

When spreading is applied, the actual Data Rate (DR) for transmitted data is determined by the Symbol Rate (SR) applied at the transmitter circuit and the spreading factor SF:

Data Rate (DR)=(Symbol Rate SR)/(Spreading Factor SF)

Symbol Rate SR corresponds to the transmitter circuit/receiver circuit sampling rates (also referred to as chip rate), and is limited by the maximum channel rate $SR_{max}$. For example, if the Symbol Rate SR is 2 MHz, and the Spreading Factor SF is 8, then the actual transmission Data Rate DR will be 250 kHz. If the Symbol Rate SR is 4 MHz, achieving the same transmission Data Rate of 250 kHz requires a Spreading Factor SF of 16.

Thus, a longer symbol period can facilitate detection, however too long a symbol period can result in wasted bandwidth. Accordingly, providing a single-carrier symbol period that optimizes the balance between bandwidth usage and ease of detectability is desirable. Accordingly, in example embodiments a leading portion of the WUP 250 (namely WUR-Reference Signal 252) is used to facilitate early packet detection and synchronization, and a spreading sequence is applied to data bits included in a trailing portion of the WUP 250 to provide a spread portion 268. In example embodiments, the trailing portion 268 that is subjected to spreading includes WUR-SIG field 254, MAC header filed 262, frame body filed 264 and FCS field 266.

Figure 4:
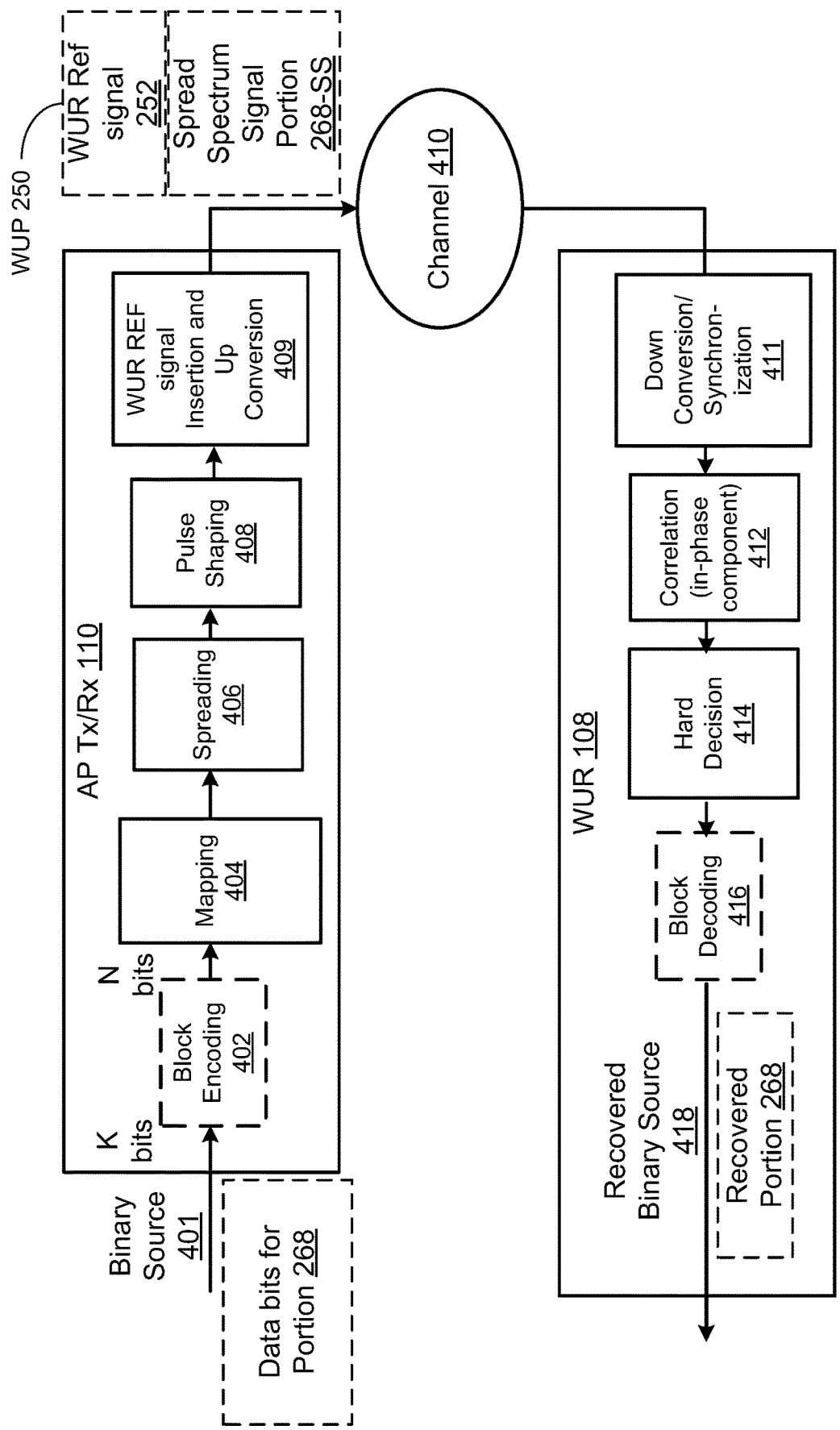
FIG. 4 is a block diagram illustrating an example of a spreading based single carrier system.

In this regard, FIG. 4 is a basic system block diagram illustrating an example spreading based single carrier system. In particular, FIG. 4 shows the process flow applied at the AP transceiver 110 and the WUR circuit 108 to the portion 268 of WUP 250 that is subjected to spreading. In some examples, each processing block 411, 412, 414, 416 shown as being performed at WUR circuit 108 represents an operation that may be implemented as a module or element that is part of a common integrated circuit. Similarly, each processing block 402, 404, 406, 408, 409 shown as being performed at AP transceiver 110 represents an operation that may for example be implemented as a module or element of a common integrated circuit.

As shown in FIG. 4, the data bits that correspond to the portion 268 of WUP 250 that is to be subjected to spreading are input as a binary source 401 to AP transceiver 110. In some examples, block encoding to apply error correction and/or compress data (e.g. encoding K bits to N bit codewords) can be applied to the binary source 401 by a block encoding operation 402, however such encoding is optional. The binary data is then mapped at mapping operation 404. Different mapping schemes can be used in different embodiments. In one example embodiment, Binary Phase-Shift Keying (BPSK) mapping is applied to the binary data at mapping operation 404. In an alternative example embodiment, On-Off Keying (OOK) is used for mapping binary data, in which case the data may already be suitably mapped without requiring mapping operation 404.

Spectrum spreading is then applied to the mapped data at spreading operation 406. In the case of BPSK-mapped data, spreading can be accomplished by multiplying each mapped data bit with a predetermined spreading sequence. In at least some examples, a non-symmetrical spreading sequence is applied. In the present disclosure, non-symmetrical means that the first half of the spreading sequence is different than the second half of the spreading sequence. That is, the first half and second half of the spreading sequence are not identical to each other, not complementary to each other, not the exact reverse of each other, and not the exact reverse of the complement of each other. For example, in the case of a Spreading Factor SF of 8, an example of a non-symmetrical spreading sequence is {−1,−1,−1,−1,−1,−1,1,1} (where −1 to 1 represents a 180 degree phase shift, with −1 corresponding to data bit "0" and 1 corresponding to data bit "1"), such that for input data bit "0" (having a BPSK value −1), the corresponding output spread data sequence would be {1,1,1,1,1,1,−1,−1}, and for input data bit "1" (having a BPSK value 1), the corresponding output spread data sequence would be {−1,−1,−1,−1,−1,−1,1,1}. Using a non-symmetrical spreading sequence can improve the correlation process at the WUR 108. In particular, when adjacent data symbols are inverted, and a symmetrical spreading sequence is used, a correlation match may occur every half sequence. A non-symmetrical sequence can address this issue by ensuring a correlation match will only occur once within the spreading sequence associated with a single data bit. This may lessen the chance of error during correlation at the WUR 108.

In the case of OOK-mapped data, spreading is performed at the spreading operation 406 by performing an XOR (Exclusive OR) operation between each data symbol and predetermined spreading sequence. In example embodiments, a non-symmetrical spreading sequence is applied for the same reason described above in respect of BPSK-mapped symbols, namely to avoid false correlations. For example, in the case of a Spreading Factor SF of 8, an example of a non-symmetrical spreading sequence to apply to an OOK-mapped data bit is {0,0,0,0,0,0,1,1} (where 0 represents OFF and 1 represents ON) such that for input data bit "0", the corresponding output spread data sequence would be {0,0,0,0,0,0,1,1}, and for input data bit "1", the corresponding output spread data sequence would be {1,1,1,1,1,0,0,0}. Accordingly, in the case of OOK-mapped input data, the resulting spread output is inverted.

The spread data sequences are then pulse shaped at pulse shaping operation 408. At WUR REF signal insertion and up-conversion operations 409, the WUR-Reference signal 252 is pre-pended to the spread data sequences, and the resulting WUP 250 is modulated onto a single carrier, then transmitted through wireless channel 410. In example embodiments, the pulse shaping applied at pulse shaping operation 408 is configured to provide transmitted symbols that have a suitably defined pulse in the frequency domain with suppressed side lobes in the time domain.

Accordingly, each individual data bit contained in WUP portion 268 is represented by a spread data sequence of SF bits (for example 8 bits in the example where SF=8) in a spread spectrum signal portion 268-SS of the transmitted wake-up signal 152 that is sent through channel 410.

At WUR circuit 108, analog-to-digital conversion is performed on the received spread spectrum signal portion 268-SS of wake-up signal 152, digital down conversion is applied to bring the signal into the baseband domain, timing of the received signal is synchronized based on the received WUR-Reference signal 252 portion of WUP 250, and the in-phase and quadrature-phase portions of the baseband signal portion 268-SS are separated. Because the BPSK- or OOK-modulated data has a real value, extraction of the data bits from the spread data sequences only needs to be performed in respect of the in-phase portion of the baseband signal. Down conversion and timing synchronization are carried out by down conversion/synchronization operations 411. Despreading or extraction of recovered data bits from the spread data sequences 268-SS is carried out by correlation and hard decision operations 412, 414. Correlation is performed by correlation operation 412 by applying the same predetermined spreading sequence used at the transceiver 110, using the same operator, to the in-phase portion of the baseband signal. In example embodiments, packet detection and synchronization performed by the WUR 108 in respect of the previously received WUR-Reference signal 252 of the WUP 205 enables the WUR 108 to accurately determine the boundaries between each of the spread data sequences that make up the spread portion 268. Accordingly, correlation operation 412 is able to align correlation timing with each spread data sequence, and the correlation value each time a correlation match occurs is used by hard decision operation 414 to determine the recovered data value. By way of example, in the case of BPSK-mapped data, if the correlation value at the time of a correlation match (i.e. at the hard decision point) is greater than zero, then the hard decision operation 414 sets the recovered bit value to "1"; otherwise the hard decision operation 414 sets the recovered bit value to "0".

Similarly, in the case of OOK-mapped data, in which an XOR function is applied at the correlation operation 412, if the correlation value at the time of a correlation match (i.e. at the hard decision point) is greater than a threshold, then the hard decision operation 414 sets the recovered bit value to "1"; otherwise the hard decision operation 414 sets the recovered bit value to "0".

In the event that block encoding was done at AP transceiver 110, corresponding block decoding can be preformed at a block decoding module 416. The resulting recovered binary source 418 corresponds to portion 268 of the WUP 250, which may for example contain information and instructions for internal wake-up signal 154 for the main WLAN transceiver circuit 106.

As noted above, in example embodiments correlation and hard decision operations 412, 414 rely on accurate packet detection and synchronization by the WUR 108 in respect of the WUR-Reference Signal 252 which precedes spread portion 268 of the WUP 250. This allows the correlation boundaries to be accurately predicted at WUR 108 to enable correct alignment of the synchronization sequence with received spread data sequences. Accordingly, in example embodiments WUR-Reference Signal 252 that is pre-pended in operation 409 is selected to include repetitions of a training sequence that has auto-correlation properties that will allow the sequence to be easily detected by and synchronized to by WUR 108 within a reasonable number of repetitions. Additionally, the WUR-Reference Signal 252 is selected to be sufficiently different from the spreading sequence applied to spread portion 268 to avoid accidental auto-correlations between WUR-Reference Signal 252 and the spread portion 268.

In view of the above desired properties, in some example embodiments a suitable sequence for the WUR-Reference Signal 252 includes the Golay sequences specified in Std 802.11ad-2012. As known in the art, Golay sequence pairs are made up of two complementary sequences whose aperiodic autocorrelations sum to zero in all out-of-phase positions, however in some applications the use of a single repeated Golay sequence (without the complementary sequence) can provide sufficient auto-correlation properties. In example embodiments, four repetitions of the 32 bit Golay sequence specified in Std 802.11ad-2012 are used as WUR-Reference Signal 252. In other example embodiments, four repetitions of the 64 bit Golay sequence specified in Std 802.11ad-2012 are used as WUR-Reference Signal 252. However, different sequences with different numbers of repetitions may be used in different embodiments, and in some embodiments complementary Golay sequence pairs may be used.

Accordingly, in example embodiments, as part of each WUF 200, AP transceiver 110 is configured to generate and transmit through channel 410 on the single carrier a WUR-Reference Signal 252 that includes a predetermined number of repetitions of an auto-correlate-able sequence. Thus, wake-up signal 152 as transmitted through channel 410 includes a non-spread reference signal portion corresponding to WUR-Reference Signal 252 followed by a spread spectrum signal portion 268-SS that corresponds to WUP portion 268.

The synchronization operation 411 of WUR 108 is configured to monitor for the same auto-correlate-able sequence and conclude that the sequence has been detected when up to the predetermined number of repetitions of the sequence have been detected at WUR 108, and then to use the timing synchronization obtained from the received WUR-Reference Signal 252 for the correlation and hard timing operations that are applied to the remainder of the WUF 200, namely the spread data sequences that correspond to WUP portion 268. In particular, in example embodiments a peak correlator output at WUR 108 that indicates at least one repetition or up to the predetermined number of repetitions is used as the indication of WUP packet detection and to establish the boundary timing of the received spread data sequences.

Figure 5:
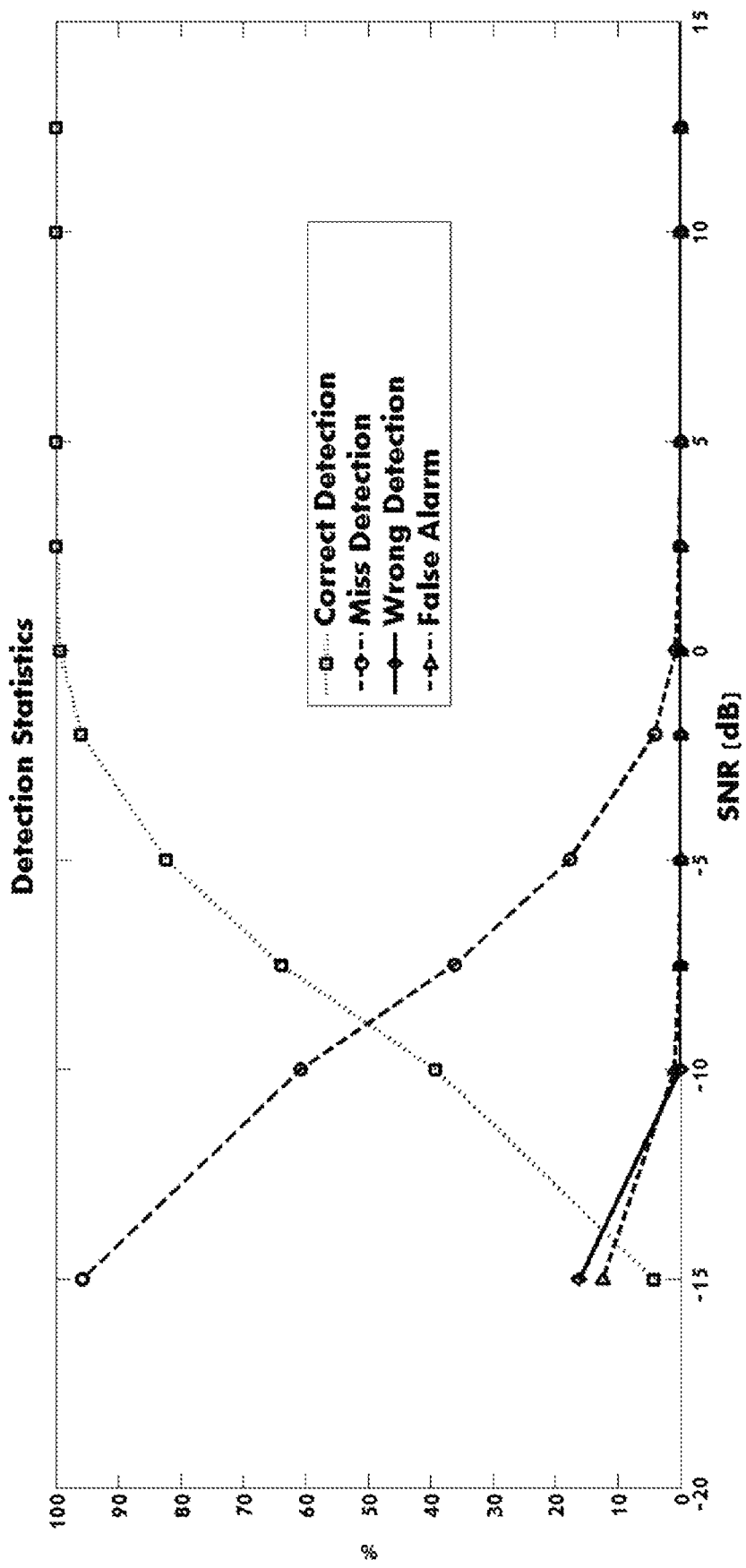
FIG. 5 is a chart showing detection statistics for an example Reference Signal.

In this regard, FIG. 5 illustrates simulation results for packet detection probability for a WUR-Reference Signal that includes 4 repetitions of a 32 bit Golay sequence. In FIG. 5, "Correct Detection" refers to probability of correctly detected WUF packets. "Miss Detection" refers to the probability of the WUR-Reference Signal not being detected by the WUR. "Wrong Detection" refers to the probability of L-STF in the Legacy Preamble being mistakenly detected. "False Alarm" is the probability of detection occurring when no WUP packet has been sent.

Figure 6:
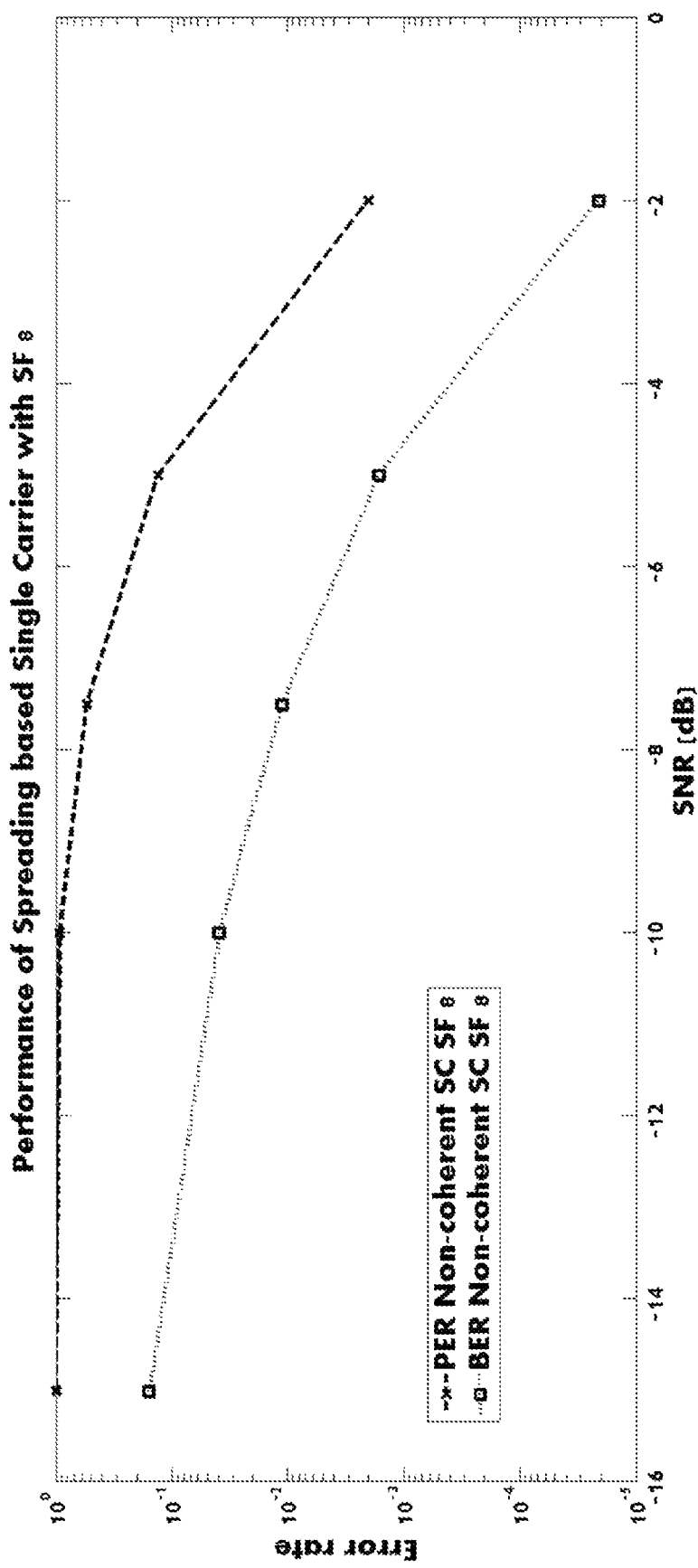
FIG. 6 is a chart showing performance of a spreading based single carrier.

FIG. 6 illustrates simulation results for retrieving WUP portion 268 at WUR 108, in the case of a spreading based single carrier with SF=8, based on a BPSK mapped packet size of 96 bits and the example spreading sequence described above. Bit Error Rate (BER) and Packet Error Rate (PER) are illustrated.

Figure 7:
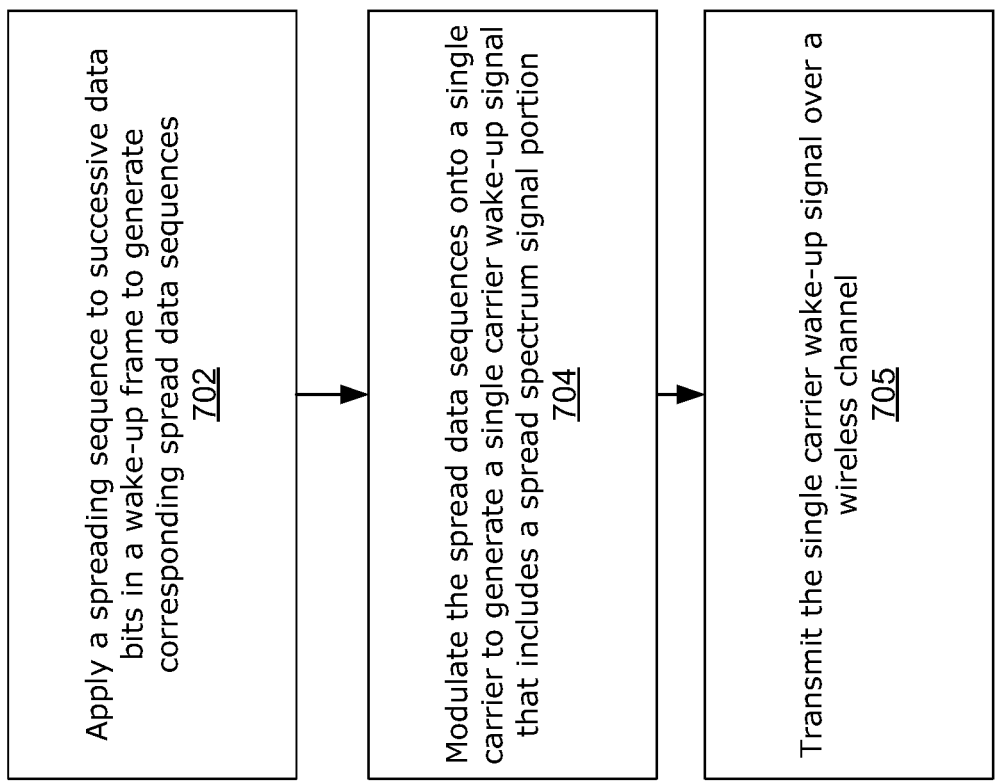
FIG. 7 is a transmitting method according to an example embodiment.

FIG. 7 shows an example method of providing a wake-up signal 152 that is applied at the AP 102, according to example embodiments. The method includes applying a spreading sequence at a spreading operation 406 to successive data bits in a wake-up frame 200 to generate corresponding spread data sequences 268-SS (step 702). The spread data sequences are modulated at up-conversion operation 409 onto a single carrier to generate a single-carrier wake-up signal 152 that includes a spread spectrum signal portion 268-SS (step 704). The single-carrier wake-up signal is then transmitted over a wireless channel (step 705).

Figure 8:
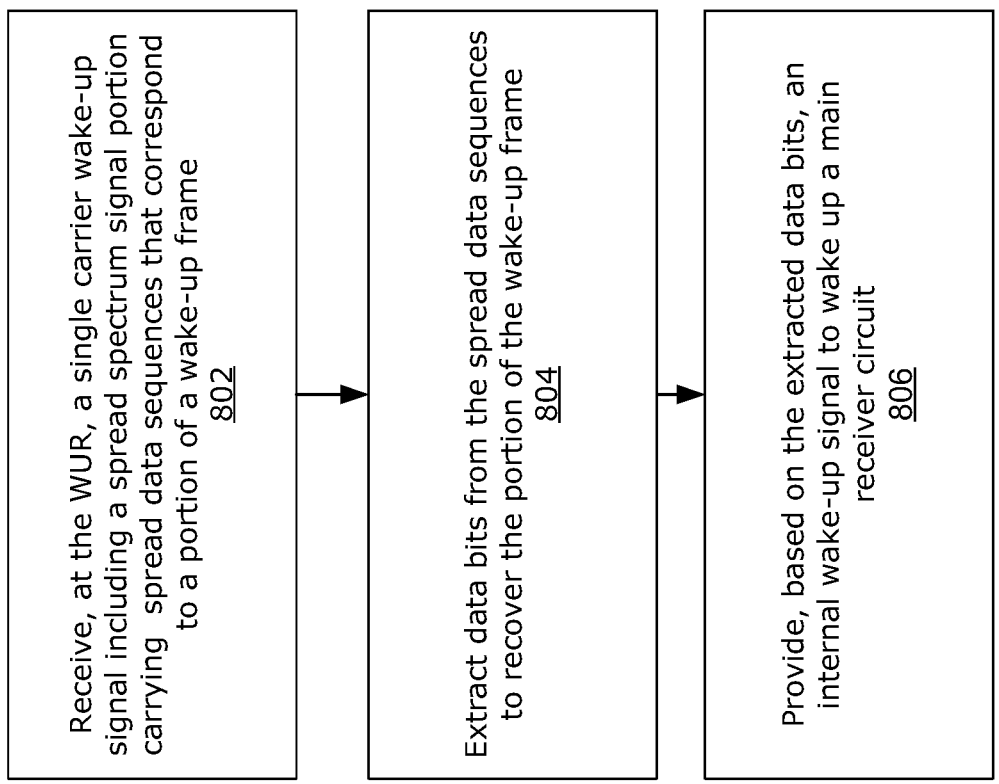
FIG. 8 is a receiving method according to an example method.

FIG. 8 shows an example method of receiving a wake-up signal 152 that is applied at a WUR 108, according to example embodiments. The method includes receiving, at the WUR circuit 108, a single-carrier wake-up signal 152 including a spread spectrum signal portion 268-SS carrying spread data sequences that correspond to a portion of a wake-up frame 200 (step 802). The correlation and hard decision operations 412, 414 at the WUR circuit 108 extract data bits from the spread data sequences 268-SS to recover the portion of the wake-up frame 200 (step 804). The WUR 108 then provides, based on the extracted data bits, an internal wake-up signal from the WUR 108 to wake up a main receiver circuit 106 of a wireless receiving device 104 (step 806).

Figure 9:
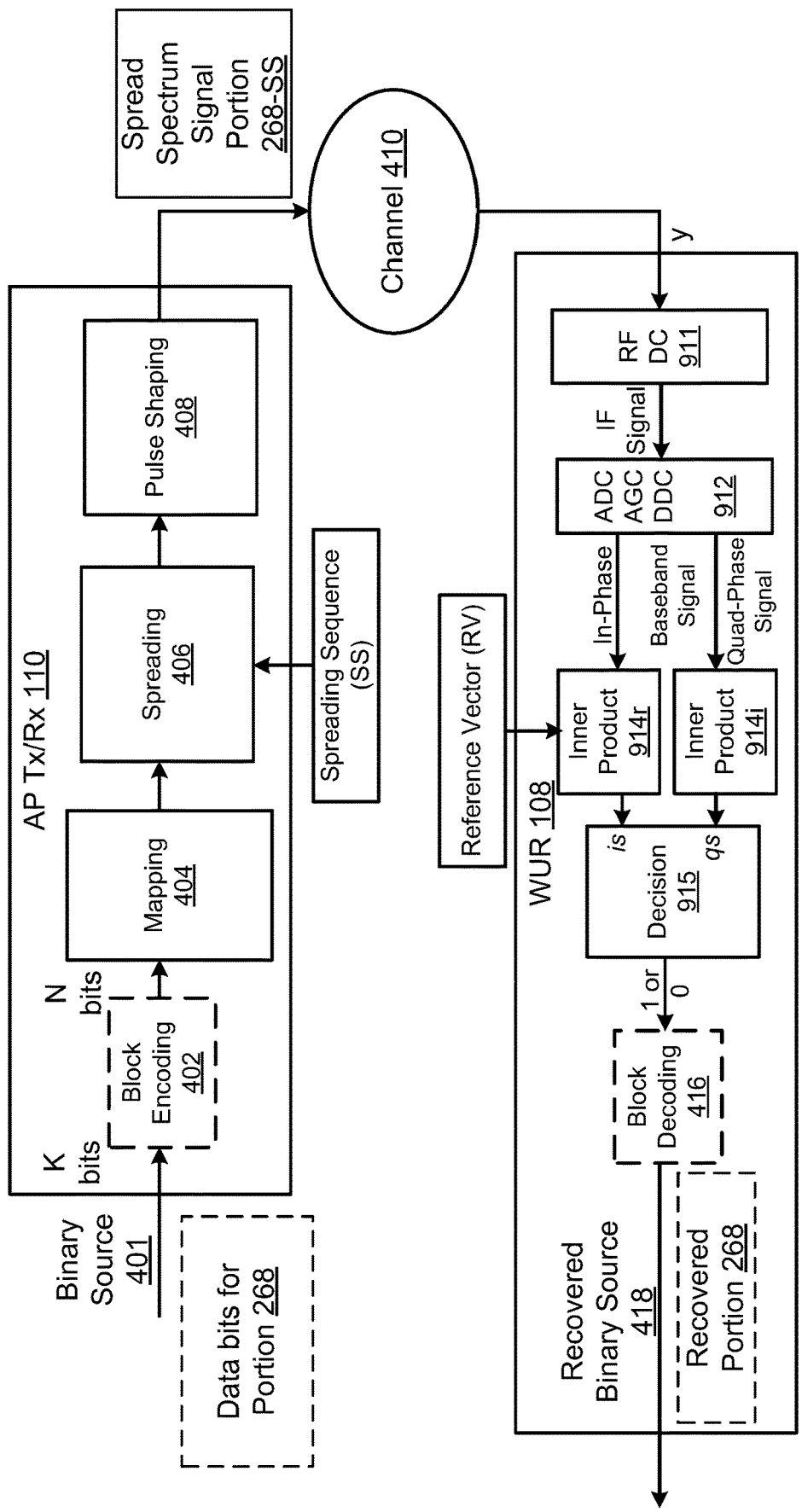
FIG. 9 is a block diagram illustrating another example of a spreading based single carrier system.

FIG. 9 is a basic system block diagram illustrating another example of a spreading based single carrier system. The example illustrated in FIG. 9 is similar to the example of FIG. 4, with modifications as discussed below. Where operations are similar to that described with respect to FIG. 4, such description will not be repeated here. As shown in FIG. 9, processing blocks 911 and 912 may take the place of blocks 411 and 412 in FIG. 4; and processing blocks 914r, 914i and 915 may take the place of block 414 in FIG. 4.

In the example of FIG. 9, spectrum spreading is applied to the mapped data at spreading operation 406, similar to that described with respect to FIG. 4. In the example shown, the spreading operation comprises multiplying each data bit with a spreading sequence SS that includes SF elements, where each element is either a one (1) or a negative one (−1). For example, for SF=8 the spreading sequence SS could be {1, −1, −1, 1, −1, 1, 1, −1} or any other combination of eight −1s or 1s. For an example where SF=16, the spreading sequence SS could be {1, −1, −1, 1, −1, 1, 1, −1, 1, −1, −1, 1, −1, 1, 1, −1} or any other combination of sixteen −1s or 1s.

In the case where the data bit input to spreading operation 406 is data 0, the corresponding output sequence will be all zeros, and where the data bit input is data 1, the corresponding output sequence will be the spreading sequence SS.

The spread data sequences are then pulse shaped at pulse shaping operation 408, modulated onto a single carrier, then transmitted through wireless channel 410, similar to that described with respect to FIG. 4. Although not shown, a WUR REF signal insertion and up conversion operation may be performed to pre-pend the WUR-Reference signal 252 to the spread data sequences prior to modulation onto a single carrier. In example embodiments, the pulse shaping applied at pulse shaping operation 408 is configured to provide transmitted symbols that have a suitably defined pulse in the frequency domain with suppressed side lobes in the time domain. In some examples, the pulse shaping operation may reduce the possibility of inter symbol interference, thus supporting a higher spreading factor than would otherwise be feasible in the absence of suitable pulse shaping.

Accordingly, each individual data bit contained in WUP portion 268 is represented by a spread data sequence of SF symbols (for example 8 symbols in the example where SF=8) in a spread spectrum signal portion 268-SS of the transmitted wake-up signal 152 that is sent through channel 410, and subsequently received at WUR circuit 108.

At WUR circuit 108, each received spread data sequence signal y is a complex value, having a real or in-phase component is and an imaginary or quadrature-phase component qs, as represented in the following equation:

$$y = is + jqs = \sqrt{is^2 + qs^2} e^{j\theta}$$

In the above equation, $\sqrt{is^2 + qs^2}$ represents a magnitude, and $e^{j\theta}$ represents a phase, with e including any phase-offset caused by the combination of carrier frequency offset (CFO), phase noise, etc. In the case of an OOK-mapped signal, the information that is required is carried only in the magnitude portion $\sqrt{is^2 + qs^2}$, and the phase $e^{j\theta}$ can be ignored.

Accordingly, in example embodiments WUR circuit 108 is configured to extract the magnitude portion of $\sqrt{is^2 + qs^2}$ corresponding to each spread data sequence contained in the transmitted spread spectrum signal portion 268-SS. The WUR circuit 108 synchronizes to the incoming signal to ensure correct timing is applied when de-spreading the received spread spectrum signal portion 268-SS. In this regard, as noted above, each WUP 250 includes WUR-Reference signal 252 that precedes the spread portion 268. As will be described in greater detail below, in example embodiments WUR-Reference Signal 252 is selected to enable accurate packet detection and synchronization, which the WUR circuit 108 uses to align data recovery with the boundaries of the incoming spread data sequences.

As shown in FIG. 9, in an example embodiment, WUR circuit 108 includes an RF down conversion (DC) operation 911 that down converts the received carrier frequency signal to an intermediate frequency (IF) signal. A series of operations 912 that include analog-to-digital conversion (ADC), automatic gain control (AGC), and digital down conversion (DDC) are then applied to the IF signal to output baseband in-phase (real) and quadrature-phase (imaginary) sequences that correspond to the data sequences encoded in the received spread spectrum signal portion 268-SS. The in-phase (real) sequence and quadrature-phase (imaginary) sequence are each processed independently at respective inner product operations 914r and 914i. In particular, at inner product operation 914r, a reference vector RV is applied to the in-phase sequence to produce a sequence of symbols that are summed to provide an in-phase component is. In an example embodiments, the reference vector RV is identical to the spreading sequence SS that was applied at the AP 110, and the inner product operation 914r includes multiplying each symbol of the in-phase sequence with a respective symbol from the reference vector RV 108. The values of the resulting sequence are summed to provide in-phase component is. Similarly, at inner product operation 914i, each symbol of the quadrature-phase sequence is multiplied with a respective symbol from the reference vector RV 108, and the values in the resulting sequence are summed to provide quadrature-phase component qs.

The in-phase component is and quadrature-phase component qs are then provided to a decision operation 915 in which the magnitude of the value $\sqrt{is^2 + qs^2}$ is compared to a threshold, and a recovered data bit of either a "0" or a "1" is generated based on whether the magnitude is above or below the threshold. By way of example, in the case of SF=8, the magnitude of the value $\sqrt{is^2 + qs^2}$ will fall between 0 and 8. In the case where the threshold is selected as the median value in the range, namely 4, a value of $\sqrt{is^2 + qs^2} > 4$ will result in a recovered data bit "1", and a value of $\sqrt{is^2 + qs^2} < 4$ will result in a recovered data bit "0". In the case of SF=16, the magnitude of the value $\sqrt{is^2 + qs^2}$ will fall between 0 and 16, and if the threshold is selected as the median value in the range it will be 8.

In the event that block encoding was done at AP transceiver 110, corresponding block decoding can be preformed at a block decoding module 416, similar to that described with respect to FIG. 4. The resulting recovered binary source 418 corresponds to portion 268 of the WUP 250, which may for example contain information and instructions for internal wake-up signal 154 for the main WLAN transceiver circuit 106.

In at least some embodiments, the recovery of WUP portion 268 is done without the need for an envelope detector at the WUR circuit 108, eliminating the need for a power consuming low pass filter.

As suggested above, WUR circuit 108 relies on accurate packet detection and synchronization to recover the WUP portion 268, including reliance on accurate packet detection and synchronization to ensure, during recovery of the WUP portion 268, that the application of the reference vector RV in inner product operations 914r, 914i is correctly aligned the oncoming spread data sequence boundaries. Accordingly, in example embodiments WUR-Reference Signal 252, which precedes Spread Spectrum Signal Portion 268-SS, is configured to include repetitions of a training sequence that has auto-correlation properties that will allow the sequence to be easily detected by and synchronized to by WUR 108 within a reasonable number of repetitions. Additionally, the WUR-Reference Signal 252 is selected to be sufficiently different from the spreading sequence applied to spread portion 268 to avoid accidental auto-correlations between WUR-Reference Signal 252 and the spread portion 268.

Figure 10:
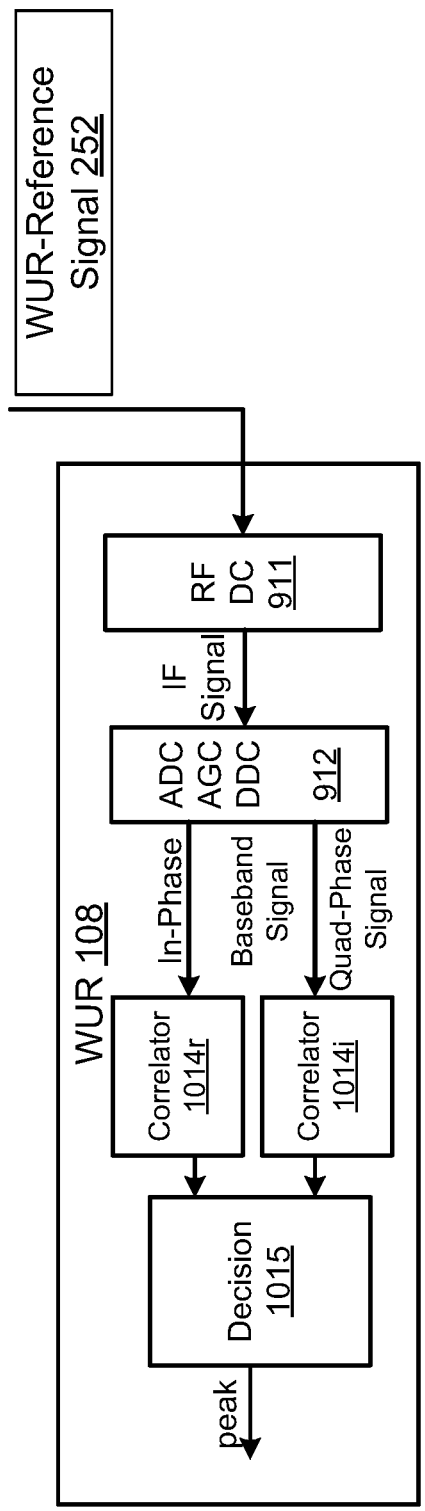
FIG. 10 is a block diagram illustrating an example receiver configuration for processing a reference signal.

FIG. 10 illustrates a block diagram of operations that WUR 108 is configured to perform in respect of received WUR-Reference Signal 252. The receiver design and operation in FIG. 10 is similar to that discussed above in respect of FIG. 9, with the exception that correlator operations 1014r, 1014i are substituted for inner product operations 914r and 914i, and a peak threshold decision operation 1015 is substituted for decision operation 915. In an example embodiment, a predetermined number of repetitions of the 32 bit or 64 bit Golay sequence specified in Std 802.11ad-2012 is mapped as a sequence of ones (1) and negative ones (−1) and used for WUR-Reference Signal 252. In some examples the Golay sequence is repeated 4 times in the WUR-Reference Signal 252. In example embodiments, the same Golay sequence can be applied at correlator operations 1014r, 1014i in WUR circuit 108 for packet detection, because only magnitude information is required for packet detection.

At WUR circuit 108, the carrier frequency modulated received signal is down converted to an intermediate frequency by RF DC operation 911, then down converted and separated into base band in-phase and quadrature-phase sequences by ADC/AGC/DOC operation 912. The in-phase and quadrature-phase sequences are subjected to respective correlator operations 1014r, 1014i, where they are each compared against a reference signal (e.g. a copy of the original Golay sequence). Magnitude information from the correlators 1014*r*, 1014*i* is provided to decision operation 1015, where the square-root of the sum of the squared in-phase correlator output and the squared quadrature-phase correlator output are repeatedly determined and compared against a magnitude threshold to detect peaks. The detected peaks correspond to a match between the received signal and the reference signal, and when the number of detected peaks reaches predetermined quantity threshold, the decision operation 1015 determines that a new packet has been detected. For example, in the case where WUR-Reference Signal 252 includes 4 repetitions, a detection of at least 3 peaks within the time period of 4 repetitions the Golay sequence will be interpreted by Decision operation 1015 as a packet detection, following which WUR circuit 108 then begins to process the trailing spread spectrum sequence portion 268-SS using the operations shown in FIG. 9.

In the example described above, a BPSK (Binary Pulse Shift Keying) type of spreading is applied at the spreading operation 406 to OOK-mapped binary data bits in that the spreading sequence SS is a sequence of 1s and −1s that is multiplied with each OOK-mapped data bit. In other example embodiments, the spreading operation 406 is configured to use an OOK-type of spreading in which the spreading sequence SS is either 0s or 1s and an XOR function is used to apply the spreading sequence SS to each OOK-data bit.

Accordingly, in an example embodiment, the spreading sequence (SS) is all zeros or all ones regardless of the spreading factor (SF) size. That is, in case of SF size 8, the spreading sequence SS is {1, 1, 1, 1, 1, 1, 1, 1} or {0, 0, 0, 0, 0, 0, 0, 0}. For the case of SF size 16, the spreading sequence SS is {1, 1, 1, 1, 1, 1, 1, 1, 1, 1, 1, 1, 1, 1, 1, 1} or {0, 0, 0, 0, 0, 0, 0, 0, 0, 0, 0, 0, 0, 0, 0, 0}. In this example, the spreading sequence SS is symmetrical. The spreading sequence SS is Exclusive-ORed with the input binary data at spreading operation 406. In particular, for an input bit of 1 and a spreading sequence SS of all 0s the resulting spread data sequence will be all 1s. For an input bit of 0 and a spreading sequence SS of all 0s the resulting spread data sequence will be all 0s. For an input bit of 1 and a spreading sequence SS of all 1s the resulting spread data sequence will be all 0s. For an input bit of 0 and a spreading sequence SS of all 1s the resulting spread data sequence will be all 1s.

WUR circuit 108 performs the operations shown in FIG. 9 in a manner similar to that described above, with the following exceptions. At each of the inner product operations 1014*r* and 1014*i*, the reference vector (RV) that is multiplied with the in-phase and quadrature-phase sequences, respectively, can be either all ones or all negative ones. For example, in case of SF size 8, the reference vector (RV) can be {1, 1, 1, 1, 1, 1, 1, 1} or {−1, −1, −1, −1, −1, −1, −1, −1}. For the case of SF size 16, the RV can be {1, 1, 1, 1, 1, 1, 1, 1, 1, 1, 1, 1, 1, 1, 1, 1} or {−1, −1, −1, −1, −1, −1, −1, −1, −1, −1, −1, −1, −1, −1, −1, −1}. The magnitude of inner product outputs from each in-phase and quadrature-phase components will be used for the detection. The magnitude is achieved by taking a square-root of the squared in-phase component and the squared quadrature-phase component.

According to the examples described above, the range of the magnitude is between 0 and 8 in case of SF 8, and is between 0 and 16 in case of SF 16. This is the case regardless of whether the reference vector RV is all ones or negative ones, and true regardless of whether the original spreading spectrum SS was all ones or all zeros. Thus, at decision operation 1015, a "one" decision is obtained when the magnitude is less than 4 in case of SF 8, otherwise a "zero" decision is obtained. A "one" decision is obtained when the magnitude is less than 8 in case of SF 16, otherwise a "zero" decision is obtained.

Although described and illustrated in separate figures, it should be understood that at least the examples of FIG. 9 and FIG. 10 may be implemented in the same system. For example, a single WUR 108 may perform the functions of the blocks 914*r*, 914*i*, 915; or the functions of the blocks 1014*r*, 1014*i*, 1015, depending on whether data detection or preamble detection is required. For example, the functions of the WUR 108 described with respect to FIG. 9 may be more suitable for data detection whereas the functions of the WUR 108 described with respect to FIG. 10 may be more suitable for preamble detection. In either case, the WUR 108 may process the signal using non-coherent detection, meaning that phase offset compensation is not used. The WUR 108 may thus process OOK-mapped data bits or BPSK-mapped data bits, without the use of phase offset compensation.

Figure 11:
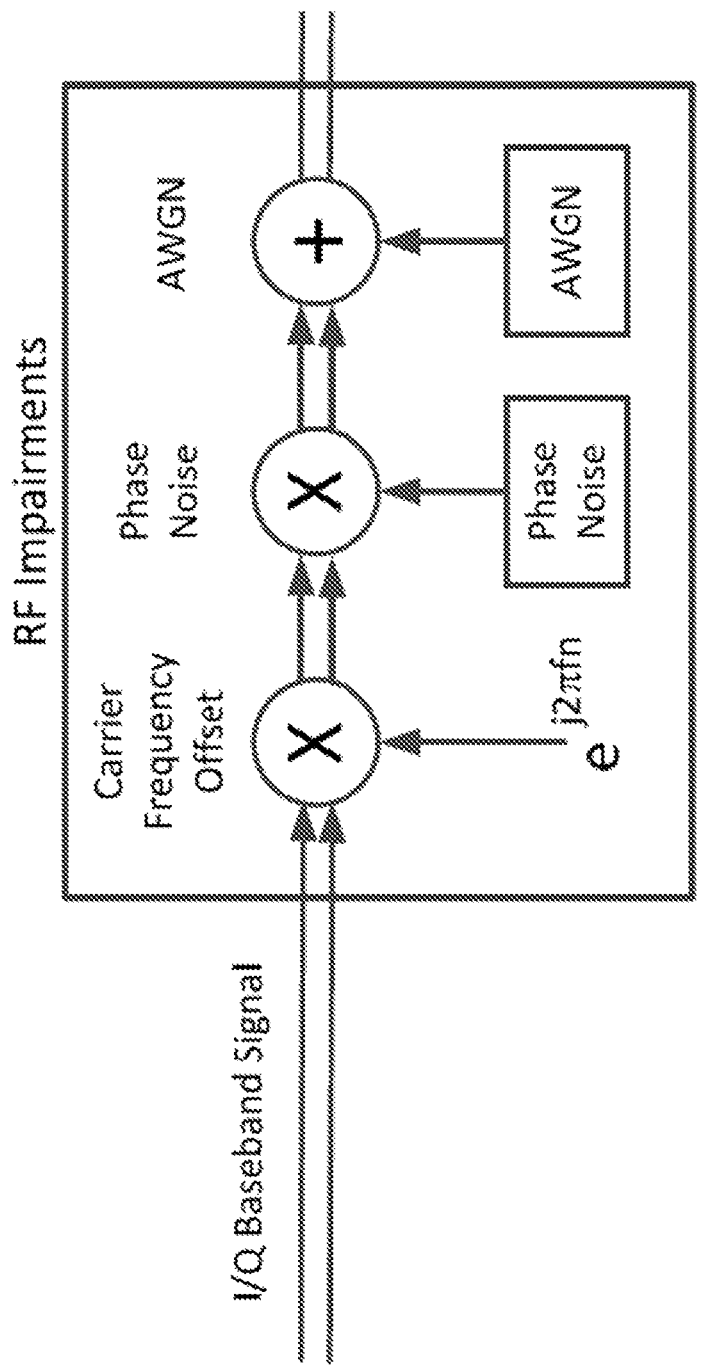
FIG. 11 is a block diagram of an example RF impairment simulator used for a simulation of a spreading based single carrier system.

FIG. 11 shows an example RF impairments model for a baseband simulation of an example embodiment described above in which a spreading sequence consisting of all ones, negative ones and combinations thereof is applied. In the example simulation, for carrier frequency offset (CFO), 200 ppm of 2.4 GHz was generated and for the phase noise, the 802.11 phase noise model was applied. In the absence of CFO compensation by a Phase Locked Loop (PLL) to reduce the receiver complexity, the CFO, the phase noise, and all other phase-offsets ended up being the residual CFO, which was linearly rotated every 4 µsec according to the 802.11 residual CFO model. The simulation results are illustrated in FIG. 12, which shows the performance of OOK-based single carrier with a spreading factor of 8 and 16 based on an all "ones" spreading sequence.

Figure 12:
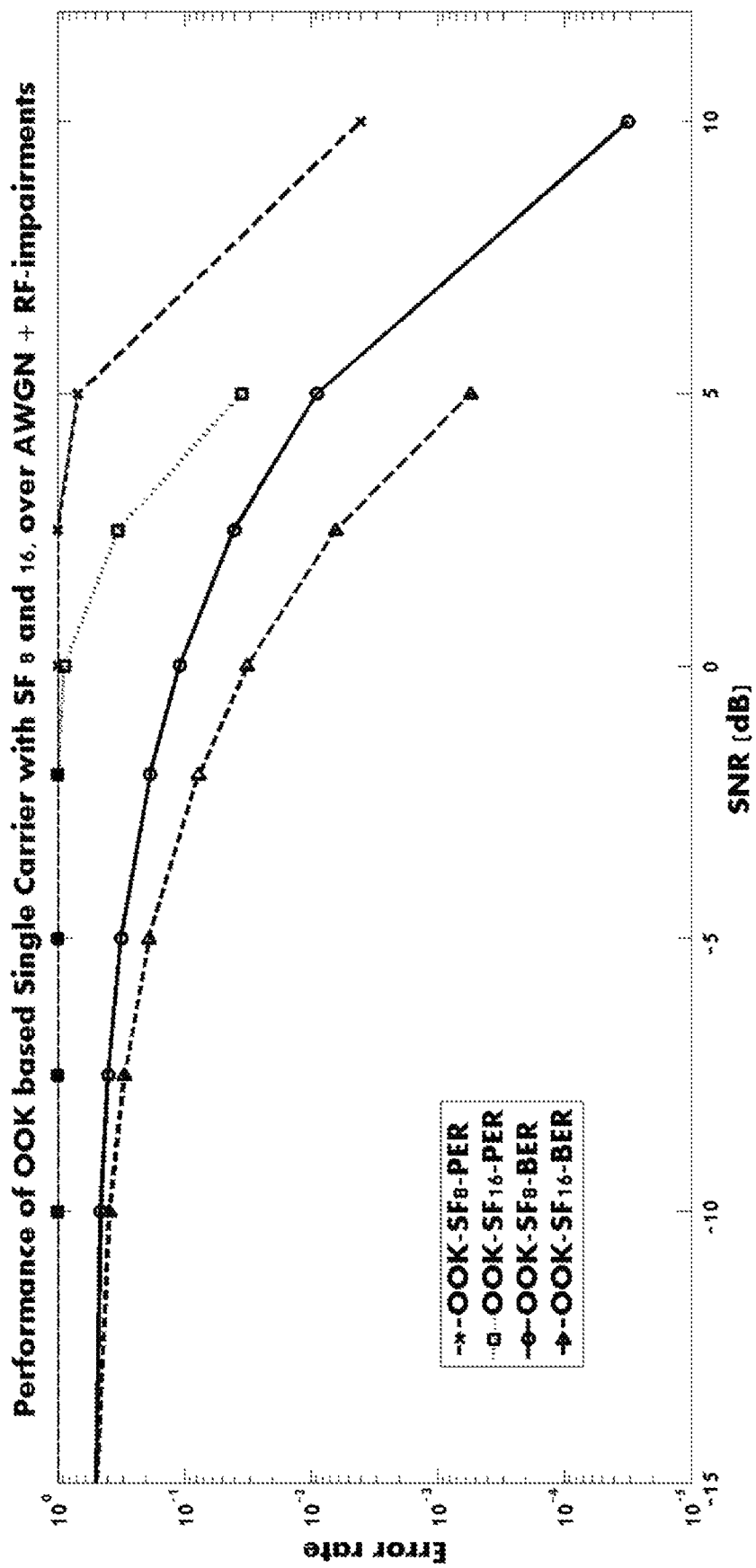
FIG. 12 is a chart showing simulated performance of a spreading based single carrier.

FIG. 12 shows the error rate performance achieved without envelope detection. The outputs of the inner product are complex numbers, which may be represented in the magnitude and the phase. The phase information represents the phase offset caused by the combination of CFO, phase noise, its linear rotation of every 4 µsec, and other phase offsets. If only the magnitude is considered, the phase offset is naturally compensated only when the information is carried in the magnitude. Because the data is only carried in the OOK modulation where the information is in the amplitude, the magnitude of the inner product output can be used for a "0" or "1" decision regardless of any CFO size or phase noise. The simulation results of FIG. 12 were achieved with a spread sequence SS of all ones and a reference vector RV of all ones. The TX power is normalized to 1. The transmission BW for the simulation is 4 MHz, and thus, the TX power has 7 dB more room to boost. In consideration of the TX power boost, the performance is well acceptable for the typical range of an 802.11 network.

In an example 1, there is provided a method of providing a wake-up signal, comprising: applying a spreading sequence to successive data bits in a wake-up frame to generate corresponding spread data sequences; modulating the spread data sequences onto a single carrier to generate a single-carrier wake-up signal that includes a spread spectrum signal portion; and transmitting the single-carrier wake-up signal over a wireless channel.

In an example 2, there is provided the method of example 1 wherein the spreading sequence is a non-symmetrical sequence.

In an example 3, there is provided the method of example 2 comprising mapping the successive data bits using Binary Phase-Shift Keying (BPSK), wherein applying a spreading sequence comprises multiplying each of the data bits by each element of the spreading sequence.

In an example 4, there is provided the method of example 3 comprising mapping the successive data bits using on-off Keying (OOK), wherein applying a spreading sequence comprises applying an exclusive-OR function to each of the data bits with each element of the spreading sequence.

In an example 5, there is provided the method of example 1 comprising modulating a reference signal onto the single carrier prior to the spread data sequences as part of the wake-up signal.

In an example 6, there is provided the method of example 1 wherein the reference signal comprises repeated sequences enabling auto-correlation.

In an example 7, there is provided the method of example 6 wherein the repeated sequences comprise Golay sequences.

In an example 8, there is provided the method of example 1, wherein the wake-up signal has a 4 MHz bandwidth.

In an example 9, there is provided the method of example 8 wherein applying the spreading sequence applies a spreading factor of 8 or 16 to each of the successive data bits.

In an example 10, there is provided the method of example 1 comprising: at a wake up receiver: receiving the single-carrier wake-up signal transmitted over the wireless channel; down-converting the wake-up signal to recover the spread data sequences from the spread spectrum signal portion; and extracting data bits from each of the spread data sequences to recover the data bits of the wake-up frame.

In an example 11, there is provided the method of example 10 wherein the single-carrier wake-up signal includes a reference signal preceding the spread spectrum signal portion, the method including, at the wake-up receiver: detecting the reference signal and synchronizing the extracting of the data bits based on timing information derived from the reference signal.

In an example 12, there is provided an access point for a wireless local area network, the access point comprising a transceiver circuit to provide a wake-up signal, the transceiver circuit configured to: apply a spreading sequence to successive data bits in a wake-up packet to generate corresponding spread data sequences; modulate the spread data sequences onto a single carrier to generate a single-carrier wake-up signal that includes a spread spectrum signal portion; and transmit the single-carrier wake-up signal over a wireless channel.

In an example 13, there is provided a method of waking up a wireless receiving device having a wake-up radio (WUR) circuit, the method comprising: receiving, at the WUR circuit, a single-carrier wake-up signal including a spread spectrum signal portion carrying spread data sequences that correspond to a portion of a wake-up frame; extracting, at the WUR circuit, data bits from the spread data sequences to recover the portion of the wake-up frame; and transmitting, based on the extracted data bits, an internal wake-up signal from the WUR circuit to wake up a main receiver circuit of the wireless receiving device.

In an example 14, there is provided the method of example 13 wherein extracting the data bits comprises separating in-phase sequence of the spread data sequences and correlating the in-phase sequence with a predetermined spreading sequence.

In an example 15, there is provided the method of example 14 wherein the predetermined spreading sequence is a non-symmetrical sequence.

In an example 16, there is provided the method of example 15 wherein the single-carrier wake-up signal carries a reference signal portion preceding the spread spectrum signal portion, the method comprising detecting a reference signal carried on the reference signal portion at the WUR circuit and determining a synchronization timing for extracting the data bits based on the reference signal.

In an example 17, there is provided the method of example 16 wherein the reference signal comprises repeated sequences enabling auto-correlation.

In an example 18, there is provided the method of example 17 wherein the repeated sequences comprise Golay sequences.

In an example 19, there is provided the method of example 16 wherein the correlating comprises determining a correlation value at the end of each spread data sequences, and setting a data bit for the spread data sequence based on the correlation value.

In an example 20, there is provided a wake-up radio (WUR) circuit enabled to perform the method of example 13.

In an example 21, there is provided a method of providing a wake-up signal, comprising: applying an spreading sequence to successive OOK-mapped data bits in a wake-up frame to generate corresponding spread data sequences; modulating the spread data sequences onto a single carrier to generate a single-carrier wake-up signal that includes a spread spectrum signal portion; and transmitting the single-carrier wake-up signal over a wireless channel.

In an example 22, there is provided the method of example 21 wherein the spreading sequence is a sequence that is made up of elements that are either ones or negative ones, wherein applying the spreading sequence comprises multiplying each of the data bits by each element of the spreading sequence.

In an example 23, there is provided the method of example 22 comprising receiving the single-carrier wake-up signal at a receiver, the receiver determining in-phase components and quadrature-phase components of received spread data sequences by applying a reference vector that is identical to the spreading sequence.

In an example 24, there is provided the method of example 21 comprising mapping the successive data bits using on-off Keying (OOK), wherein spreading sequence is a sequence of elements that are either all ones or all zeros, wherein applying the spreading sequence comprises applying an exclusive-OR function to each of the data bits with each element of the spreading sequence.

In an example 25, there is provided the method of example 24 comprising receiving the single-carrier wake-up signal at a receiver, the receiver determining in-phase components and quadrature-phase components of received spread data sequences by applying a reference vector that is either all ones or all negative ones.

In an example 26, there is provided the method of example 21 comprising modulating a reference signal onto the single carrier prior to the spread data sequences as part of the wake-up signal, the reference signal comprising repeated Golay sequences.

In an example 27, there is provided the method of example 21 wherein applying the spreading sequence applies a spreading factor of 8 or 16 to each of the successive data bits.

In an example 28, there is provided an access point for a wireless local area network, the access point comprising a transceiver circuit to provide a wake-up signal, the transceiver circuit configured perform the method of any one of examples 21 to 27.

In an example 29, there is provided a method of processing a single carrier spread spectrum signal containing a representation of OOK-mapped data bits, comprising: receiving, at a receiver circuit, a single-carrier signal including a spread spectrum signal portion carrying spread data sequences that correspond to OOK-mapped data bits of a data frame; separating, at the receiver circuit, the spread spectrum signal portion into sequences that comprise in-phase and quadrature-phase sequences; determining, at the receiver circuit for each in-phase sequence, an in-phase component; determining, at the receiver circuit for each quadrature-phase sequence, a quadrature-phase component; assigning a data bit value, at the receiver circuit for each sequence, based on a magnitude of the in-phase and quadrature-phase components.

In an example 30, there is provided the method of example 29 wherein: determining an in-phase component comprises multiplying the in-phase sequence with a reference vector and summing values of a resulting sequence to provide the in-phase component; and determining an quadrature-phase sequence component comprises multiplying the quadrature-phase sequence with the reference vector and summing values of a resulting sequence to provide the quadrature-phase component, wherein the reference vector consists of a sequence of ones, negative ones or combinations of ones and negative ones, and is identical to a spreading sequence applied to the OOK-mapped data bits prior to transmission of the single carrier spread spectrum signal.

In an example 31, there is provided the method of example 29 wherein: determining an in-phase component comprises multiplying the in-phase sequence with a reference vector and summing values of a resulting sequence to provide the in-phase component; and determining an quadrature-phase sequence component comprises multiplying the quadrature-phase sequence with the reference vector and summing values of a resulting sequence to provide the quadrature-phase component, wherein the reference vector consists of a sequence of entirely all ones or a sequence of entirely all negative ones.

In an example 32, there is provided the method of example 29 wherein the single-carrier wake-up signal carries a reference signal portion preceding the spread spectrum signal portion, the method comprising detecting a reference signal carried on the reference signal portion at the WUR circuit and determining a synchronization timing for extracting the data bits based on the reference signal, wherein the reference signal comprises repeated sequences.

In an example 33, there is provided a wake-up radio (WUR) circuit enabled to perform the method of examples 29 to 32.

The present disclosure may provide certain example algorithms and calculations for implementing examples of the disclosed methods and systems. However, the present disclosure is not bound by any particular algorithm or calculation.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of processing a single-carrier signal containing a representation of data bits, the method comprising:
   receiving, at a receiver circuit, a single-carrier signal including a spread spectrum signal portion carrying spread data sequences that correspond to data bits of a data frame;
   separating, at the receiver circuit, each spread data sequence into an in-phase sequence and a quadrature-phase sequence;
   determining, at the receiver circuit, for each in-phase sequence, an in-phase component;
   determining, at the receiver circuit, for each quadrature-phase sequence, a quadrature-phase component, wherein determining the in-phase component and determining the quadrature-phase component are performed by separate operators; and
   assigning, at the receiver circuit, a data bit value for each spread data sequence, based on a comparison of a combined magnitude of the respective in-phase and quadrature-phase components against a threshold.

2. The method of claim 1, wherein determining the in-phase component comprises multiplying the in-phase sequence with a reference vector, and determining the quadrature-phase component comprises multiplying the quadrature-phase sequence with the reference vector, the reference vector being identical to a spreading sequence used for generation of the spread spectrum signal portion.

3. The method of claim 1, wherein determining the in-phase component comprises multiplying the in-phase sequence with a reference vector, and determining the quadrature-phase component comprises multiplying the quadrature-phase sequence with the reference vector, the reference vector being either all ones or all negative ones.

4. The method of claim 1, wherein the spread spectrum signal portion contains a representation of on-off keying (OOK)-mapped data bits.

5. The method of claim 1, wherein the spread spectrum signal portion contains a representation of binary phase-shift keying (BPSK)-mapped data bits.

6. The method of claim 1, wherein processing the single-carrier signal is performed using non-coherent detection.

7. The method of claim 1, further comprising:
transmitting, at the receiver circuit, an internal wake-up signal, based on the assigned data bit values.

8. A receiver circuit configured to:
receive a single-carrier signal including a spread spectrum signal portion carrying spread data sequences that correspond to data bits of a data frame;
separate each spread data sequence into an in-phase sequence and a quadrature-phase sequence;
determine, using a first operator, for each in-phase sequence, an in-phase component;
determine, using a second operator, for each quadrature-phase sequence, a quadrature-phase component; and
assign a data bit value for each spread data sequence, based on a comparison of a combined magnitude of the respective in-phase and quadrature-phase components against a threshold.

9. The receiver circuit of claim 8, wherein the receiver circuit is configured to determine the in-phase component by multiplying the in-phase sequence with a reference vector, and determine the quadrature-phase component by multiplying the quadrature-phase sequence with the reference vector, the reference vector being identical to a spreading sequence used for generation of the spread spectrum signal portion.

10. The receiver circuit of claim 8, wherein the receiver circuit is configured to determine the in-phase component by multiplying the in-phase sequence with a reference vector, and determine the quadrature-phase component by multiplying the quadrature-phase sequence with the reference vector, the reference vector being either all ones or all negative ones.

11. The receiver circuit of claim 8, wherein the spread spectrum signal portion contains a representation of on-off keying (OOK)-mapped data bits.

12. The receiver circuit of claim 8, wherein the spread spectrum signal portion contains a representation of binary phase-shift keying (BPSK)-mapped data bits.

13. The receiver circuit of claim 8, wherein the receiver circuit is configured to process the single-carrier signal using non-coherent detection.

14. The receiver circuit of claim 8, wherein the receiver circuit is a wake-up receiver circuit that is further configured to transmit an internal wake-up signal to another receiver circuit, based on the assigned data bit values.

15. A method of providing a wake-up signal, comprising:
applying a spreading sequence to successive data bits in a wake-up frame to generate corresponding spread data sequences, wherein the spreading sequence is a non-symmetrical sequence in which the non-symmetrical sequence exhibits non-symmetry between a first half and a second half of the non-symmetrical sequence;
modulating the spread data sequences onto a single carrier to generate a single-carrier wake-up signal that includes a spread spectrum signal portion containing the spread data sequences; and
transmitting the single-carrier wake-up signal over a wireless channel;
wherein the non-symmetry exhibited by the non-symmetrical sequence includes at least:
the first half and the second half of the non-symmetrical sequence are not exact reverse of each other;
the first half and the second half of the non-symmetrical sequence are not identical to each other; and
the first half and the second half of the non-symmetrical sequence are not complementary to each other.

16. The method of claim 15 further comprising mapping the successive data bits using Binary Phase-Shift Keying (BPSK), wherein applying a spreading sequence comprises multiplying each of the data bits by each element of the spreading sequence.

17. The method of claim 15 further comprising mapping the successive data bits using on-off Keying (OOK), wherein applying a spreading sequence comprises applying an exclusive-OR function to each of the data bits with each element of the spreading sequence.

18. The method of claim 15 wherein the non-symmetry exhibited by the non-symmetrical sequence further includes:
the first half and the second half of the non-symmetrical sequence are not exact reverse of complements of each other.

19. An access point for a wireless local area network, the access point comprising a transceiver circuit to provide a wake-up signal, the transceiver circuit configured to:
apply a spreading sequence to successive data bits in a wake-up packet to generate corresponding spread data sequences, wherein the spreading sequence is a non-symmetrical sequence in which the non-symmetrical sequence exhibits non-symmetry between a first half and a second half of the non-symmetrical sequence;
modulate the spread data sequences onto a single carrier to generate a single-carrier wake-up signal that includes a spread spectrum signal portion containing the spread data sequences; and
transmit the single-carrier wake-up signal over a wireless channel;
wherein the non-symmetry exhibited by the non-symmetrical sequence includes at least:
the first half and the second half of the non-symmetrical sequence are not exact reverse of each other;
the first half and the second half of the non-symmetrical sequence are not identical to each other; and
the first half and the second half of the non-symmetrical sequence are not complementary to each other.

20. The access point of claim 19 wherein the successive data bits are mapped using Binary Phase-Shift Keying (BPSK), and the spreading sequence is applied by multiplying each of the data bits by each element of the spreading sequence.

21. The access point of claim 19 wherein the successive data bits are mapped using on-off Keying (OOK), and the spreading sequence is applied by applying an exclusive-OR function to each of the data bits with each element of the spreading sequence.

22. The access point of claim 19 wherein the non-symmetry exhibited by the non-symmetrical sequence further includes:
the first half and the second half of the non-symmetrical sequence are not exact reverse of complements of each other.

* * * * *